United States Patent [19]

Mayer et al.

[11] Patent Number: 4,647,675
[45] Date of Patent: Mar. 3, 1987

[54] RHODAMINE DYES

[75] Inventors: Udo Mayer, Frankenthal; Andreas Oberlinner, Ludwigshafen, both of Fed. Rep. of Germany

[73] Assignee: BASF Aktiengesellschaft, Ludwigshafen, Fed. Rep. of Germany

[21] Appl. No.: 753,783

[22] Filed: Jul. 11, 1985

[30] Foreign Application Priority Data

Jul. 12, 1984 [DE] Fed. Rep. of Germany ....... 3425631

[51] Int. Cl.$^4$ ............................................ C07D 311/82
[52] U.S. Cl. ..................................... 549/394; 548/525;
546/196; 546/187; 544/375; 544/372; 544/360;
544/150; 544/141; 544/130; 544/121; 544/111;
8/565; 8/567; 8/568; 8/574; 8/578; 8/579
[58] Field of Search ................ 549/394, 227; 548/525;
546/187, 196; 544/150, 141, 130, 121, 111, 375,
372, 360

[56] References Cited

U.S. PATENT DOCUMENTS

| | | | |
|---|---|---|---|
| 3,367,946 | 2/1968 | Stryker | 549/227 |
| 3,708,499 | 1/1973 | Andree | 549/227 |
| 3,767,358 | 10/1973 | Stryker | 549/227 |
| 3,849,065 | 11/1974 | Schmeidl | 549/227 |
| 4,290,955 | 9/1981 | Cincotta et al. | 549/394 |

FOREIGN PATENT DOCUMENTS 60-54381  3/1985  Japan.

Primary Examiner—Nicky Chan
Attorney, Agent, or Firm—Oblon, Fisher, Spivak, McClelland & Maier

[57] ABSTRACT

Novel compounds of the general formula I

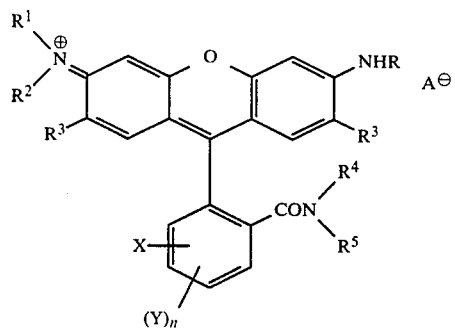

where $A^{\ominus}$ is an anion, R is hydrogen or unsubstituted or substituted alkyl or cycloalkyl, $R^1$ and $R^2$ independently of one another are each hydrogen or unsubstituted or substituted alkyl or cycloalkyl, or one of the radicals may furthermore be aryl, or $R^1$ and $R^2$, together with the nitrogen atom, form a saturated heterocyclic structure, the radicals $R^3$ independently of one another are each hydrogen or $C_1$–$C_4$-alkyl, $R^4$ and $R^5$ independently of one another are each unsubstituted or substituted alkyl or cycloalkyl, or one of the radicals may furthermore be hydrogen, aryl or hetaryl, $R^4$ and $R^5$, together with the nitrogen atom, form a saturated heterocyclic structure, n is 1, 2 or 3, X is hydrogen, chlorine, bromine, $C_1$–$C_4$-alkyl, $C_1$–$C_4$-alkoxy or nitro and Y is hydrogen or chlorine, are particularly useful for dyeing paper stocks.

5 Claims, No Drawings

RHODAMINE DYES

The present invention relates to compounds of the general formula I

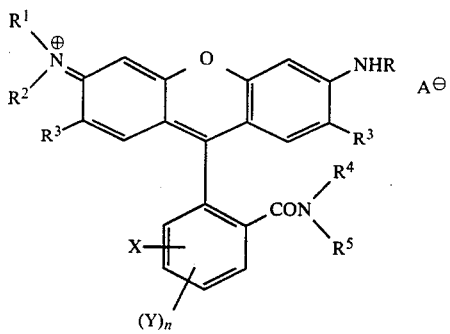

where $A^{\ominus}$ is an anion, R is hydrogen or unsubstituted or substituted alkyl or cycloalkyl, $R^1$ and $R^2$ independently of one another are each hydrogen or unsubstituted or substituted alkyl or cycloalkyl, or one of the radicals may furthermore be aryl, or $R^1$ and $R^2$, together with the nitrogen atom, form a saturated heterocyclic structure, the radicals $R^3$ independently of one another are each hydrogen or $C_1$-$C_4$-alkyl, $R^4$ and $R^5$ independently of one another are each unsubstituted or substituted alkyl or cycloalkyl, or one of the radicals may furthermore be hydrogen, aryl or hetaryl, $R^4$ and $R^5$, together with the nitrogen atom, form a saturated heterocyclic structure, n is 1, 2 or 3, X is hydrogen, chlorine, bromine, $C_1$-$C_4$-alkyl, $C_1$-$C_4$-alkoxy or nitro and Y is hydrogen or chlorine.

Unsubstituted or substituted alkyl or cycloalkyl radicals R, $R^1$ and $R^2$ are, for example, $C_1$-$C_{13}$-alkyl which may furthermore be substituted by hydroxyl, $C_1$-$C_{13}$-alkoxy, chlorine, cyano, phenyl, tolyl, chlorophenyl or methoxyphenyl and may be interrupted by oxygen, and $C_1$-$C_4$-alkylsubstituted cycloalkyl. Specific examples are $CH_3$, $C_2H_5$, $C_3H_7$, $C_4H_9$, $C_5H_{11}$, $C_6H_{13}$, $C_8H_{17}$, $C_{10}H_{21}$, $C_{12}H_{23}$, $C_{13}H_{25}$,

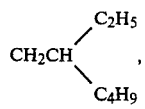

$C_2H_4OH$, $C_3H_6OH$, $C_2H_4OCH_3$, $C_2H_4OC_2H_5$, $C_2H_4OC_3H_7$, $C_2H_4OC_4H_9$, $C_3H_6OCH_3$, $C_3H_6OC_4H_9$, $C_2H_4OC_2H_4OCH_3$, $C_2H_4OC_2H_4OC_2H_5$, $C_2H_4OC_2H_4OC_4H_9$, $CH(CH_3)CH_2OC_2H_4OCH_3$, $CH_2CH_2Cl$, $C_2H_4CN$, $CH_2C_6H_5$, $C_2H_4C_6H_5$, $CH_2C_6H_4CH_3$, $CH_2C_6H_4Cl$, $CH_2C_6H_4OCH_3$, $CH_2C_6H_3(CH_3)_2$, cyclopentyl, cyclohexyl and methylcyclohexyl. The empirical formulae apply to the n- and iso-radicals.

Examples of saturated heterocyclic structures formed by $R^1$ and $R^2$, or $R^4$ and $R^5$, together with the nitrogen atom are pyrrolidino, piperidino, morpholino, piperazino, N-methylpiperazino and N-β-hydroxyethylpiperazino.

Alkyl radicals $R^3$ are butyl, propyl, ethyl or, preferably, methyl.

Examples of radicals $R^4$ and $R^5$ are the radicals stated above for $R^1$ and $R^2$ and furthermore

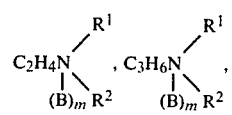

alkylene-Z-alkylene-$B^1$ or unsubstituted or substituted phenyl or naphthyl, where m is 0 or 1, B is hydrogen or unsubstituted or substituted alkyl, Z is O, S or

and $B^1$ is alkoxy or

B is hydrogen or, for example, $CH_3$, $C_2H_5$, $CH_2C_6H_5$, $C_2H_4OH$ or $C_3H_6OH$.

Specific examples of radicals in addition to those stated above for $R^4$ and $R^5$ are $C_2H_4NH_2$, $C_3H_6NH_2$,

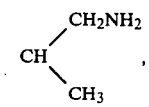

$C_3H_6NHCH_3$, $C_2H_4N(CH_3)_2$, $C_2H_4N(C_2H_5)_2$, $C_2H_4N(C_3H_7)_2$, $C_2H_4N(C_4H_9)_2$, $C_3H_6N(C_2H_5)_2$, $C_2H_4N^{\oplus}(CH_3)_3$, $C_3H_6N^{\oplus}(CH_3)_3$, $C_3H_6OC_3H_6NH_2$, $C_3H_6OC_3H_6N(CH_3)_2$, $C_2H_4NHC_2H_4NH_2$ or $C_3H_6NHC_3H_6NH_2$.

Anion $A^{\ominus}$ is an organic or inorganic ion, eg. chloride, bromide, sulfate, bisulfate, methylsulfate, aminosulfonate, perchlorate, benzenesulfonate, oxalate, maleate, acetate, hydroxyacetate, methoxyacetate, propionate, lactate, succinate, tartrate or methanesulfonate.

Compounds of the formula I can be prepared by converting a compound of the formula

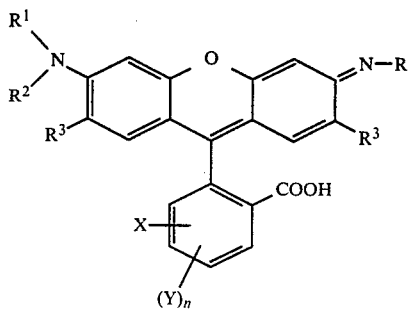

or

-continued

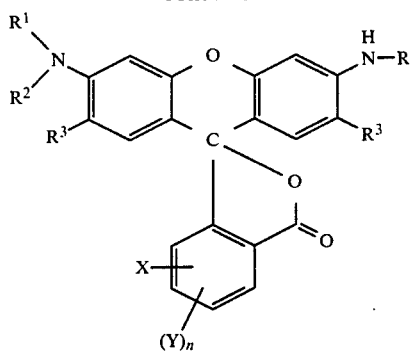

to the amide. The Examples which follow illustrate the preparation. Parts and percentages are by weight, unless stated otherwise.

The compounds of the formula I are useful for dyeing anionically modified fibers, for the preparation of printing pastes and printing inks, and for dyeing leather and plastics and in particular paper stocks. Surprisingly, these compounds can also be used for dyeing bleached (wood-free or low-wood) pulps in brilliant red hues. Bath exhaustion is very high.

Of particular industrial importance are compounds of the formula Ia

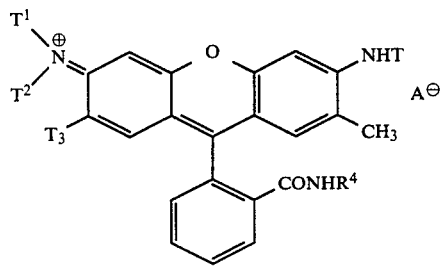

where T is $C_1$–$C_4$-alkyl, $T^1$ is hydrogen or $C_1$–$C_4$-alkyl, $T^2$ is $C_1$–$C_4$-alkyl or cyclohexyl, $T^1$ and $T^2$, together with the nitrogen atom, form a saturated heterocyclic structure, $T^3$ is hydrogen or methyl and $A^\ominus$ and $R^4$ have the stated meanings.

T is particularly preferably $C_2H_5$, $T^1$ is particularly preferably H, $CH_3$ or $C_2H_5$, $T^2$ is particularly preferably $CH_3$, $C_2H_5$ or $C_6H_{11}$, $R^4$ is particularly preferably branched alkyl of 3 to 13 carbon atoms, eg.

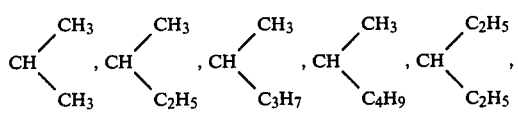

$CH(CH_3)C_2H_4CH(CH_3)_2$, $CH(CH_3)C_3H_6CH(CH_3)_2$ or

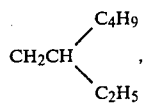

or $C_5$–$C_7$-cycloalkyl which is unsubstituted or substituted by hydroxyl or $C_1$–$C_4$-alkyl.

EXAMPLE 1

8.28 parts of the rhodamine dye of the formula I, in the form of the base, and 2.35 parts of benzylamine are introduced into 50 parts by volume of chlorobenzene. 3.06 parts of phosphorus oxytrichloride are run in over about 15 minutes, the temperature increasing to about 50° C. The reaction mixture is refluxed for 3 hours.

100 parts of water are added, after which distillation is continued until chlorobenzene no longer passes over. 25 parts of a 10% strength sodium hydroxide solution are then added, and the stirred mixture is left to cool. 8.5 parts of a crystalline product of the formula II are obtained, the product being filtered off under suction, washed with water and dried at 60° C.

The same results are obtained if chlorobenzene is replaced with chloroform, 1,2-dichloroethane, trichloroethylene, toluene, xylene or dichlorobenzene, and $POCl_3$ is replaced with an equimolar amount of $PCl_3$ or $PCl_5$.

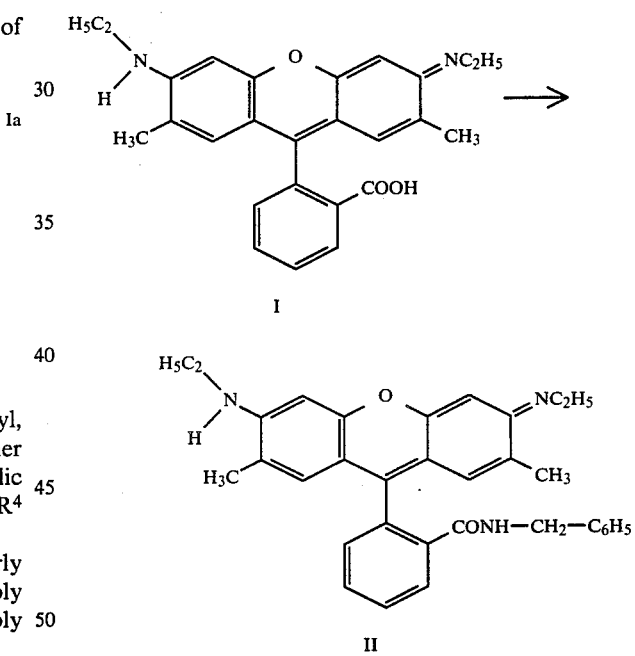

The dye base of the formula II dissolves in dilute acetic acid with the formation of the quaternary salt with acetate as the anion.

EXAMPLE 2

8.28 parts of the dye base of the formula I (cf. Example 1) and 1.5 parts of methylammonium chloride in 50 parts by volume of 1,2-dichloroethane are reacted in the presence of 3.06 parts of phosphorus oxytrichloride in the course of 5 hours under reflux. The reaction mixture is worked up by a procedure similar to that described in Example 1 to give 8.0 parts of the dye base of the formula III

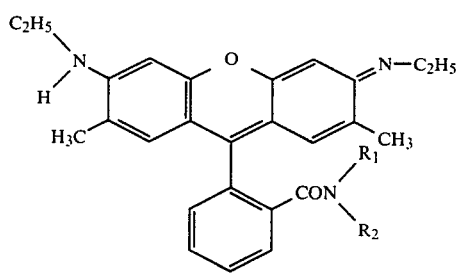

III where $R_1$ is H and $R_2$ is $CH_3$.

The procedure described in Example 2 was also used to obtain the dyes of the formula III which are characterized in the Table, methylammonium chloride being replaced with ethylammonium chloride, dimethylammonium chloride or diethylammonium chloride or the corresponding amines $R_2NH_2$:

| Example | $R_1$ | $R_2$ | λ max. (nm) |
|---|---|---|---|
| 3 | H | $C_2H_5$ | 534 |
| 4 | $CH_3$ | $CH_3$ | 532.5 |
| 5 | $C_2H_5$ | $C_2H_5$ | 532 |
| 6 | H | $nC_3H_7$ | 534 |
| 7 | H | $CH(CH_3)_2$ | 534 |
| 8 | H | $nC_4H_9$ | 534 |
| 9 | H | $CH(CH_3)(C_2H_5)$ | 534 |
| 10 | H | $CHC_2H_4CHCH_3$ with $CH_3$, $CH_3$ | 534 |
| 11 | H | $CHC_3H_6CHCH_3$ with $CH_3$, $CH_3$ | 532 |
| 12 | H | $CH_2CHC_4H_9$ with $C_2H_5$ | 534 |
| 13 | H | $CH_2C_6H_5$ | 534 |
| 14 | H | $C_2H_4C_6H_5$ | 534 |
| 15 | H | $C_6H_5$ | 530.5 |
| 16 | H | $C_6H_{12}$ | 534 |
| 17 | H | $C_2H_4OCH_3$ | 533.5 |
| 18 | H | $C_3H_6OCH_3$ | 534 |
| 19 | H | $C_3H_6OC_2H_5$ | 534 |
| 20 | H | $C_3H_6OCH_2CHC_3H_6CH_3$ with $C_2H_5$ | 534 |
| 21 | H | $C_3H_6N(CH_3)_2$ | 533.5 |
| 22 | H | $CH_2CHCH_3$ with $OH$ | 533 |

EXAMPLE 23

7.8 parts of the rhodamine dye base of the formula IV, where $R_3$ is $N(CH_3)_2$, are reacted with 1.6 parts of n-butylamine in 50 parts by volume of 1,2-dichloroethane, in the presence of 3.06 parts of phosphorus oxytrichloride, using a method similar to that described in Example 1. 6 parts of the dye base V, where $R_3$ is $N(CH_3)_2$ and $R_4$ is $n-C_4H_9$, are obtained (λmax.: 541 nm).

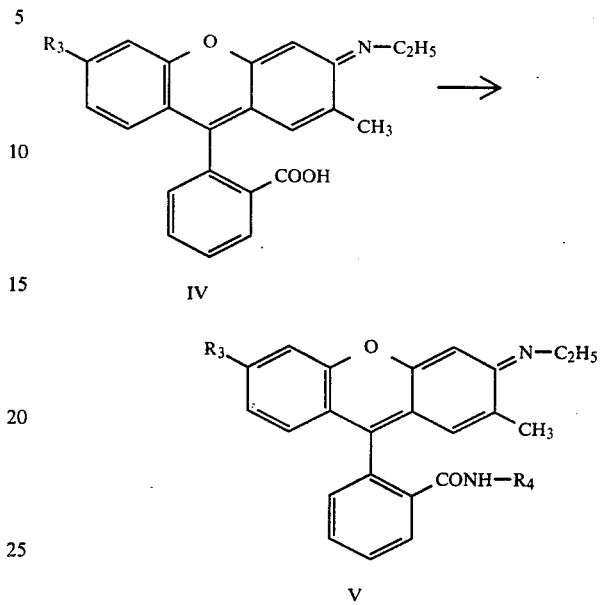

The compound of the formula IV, where $R_3$ is $N(CH_3)_2$, can be prepared as follows:

57 parts of 2-(2'-hydroxy-4'-dimethylaminobenzoyl)-benzoic acid of the formula VI, prepared by a conventional method from m-dimethylaminophenol and phthalic anhydride, are dissolved in 410 parts of 96% strength sulfuric acid at room temperature. 30.2 parts of 3-ethylamino-p-cresol of the formula VII are added, after which the mixture is heated to 50° C., kept at this temperature for 3 hours and then discharged onto 1,100 parts of ice water. The crystalline precipitate is filtered off under suction, washed with 200 parts of water and then dissolved in 400 parts of water at about 70° C. The solution is brought to pH 11 with sodium hydroxide solution, the dye base of the formula VIII being precipitated in crystalline form. The product is filtered off under suction, washed with water and dried at 60° C. The yield is 52 parts.

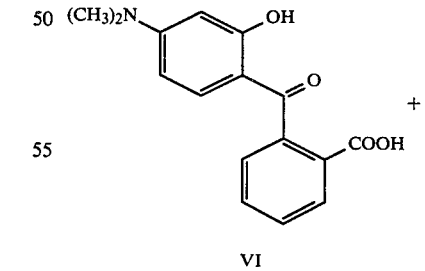

VI

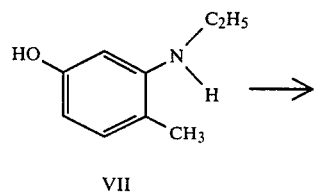

VII

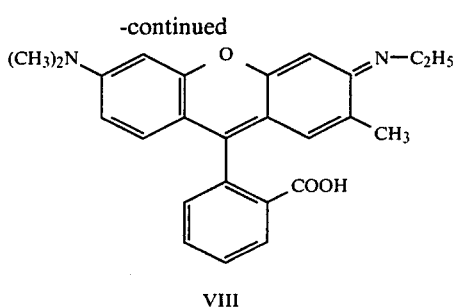

VIII

The dyes of the formula V which are described in the Table were obtained by the same procedure:

| Example | $R_3$ | $R_4$ | λ max. (nm) |
|---------|-------|-------|-------------|
| 24 | $N(CH_3)_2$ | $CH_2C_6H_5$ | 542.5 |
| 25 | $N(CH_3)_2$ | $C_2H_4C_6H_5$ | 541 |
| 26 | $N(C_2H_5)_2$ | $n-C_4H_9$ | 546 |
| 27 | $N(C_2H_5)_2$ | $CH_2C_6H_5$ | 549.5 |
| 28 | $N(C_2H_5)_2$ | $C_2H_4C_6H_5$ | 547 |
| 29 | pyrrolidino | $n-C_4H_9$ | 545 |
| 30 | pyrrolidino | $CH_2C_6H_5$ | 546.5 |
| 31 | pyrrolidino | $C_2H_4C_6H_5$ | 547 |
| 32 | morpholino | $n-C_4H_9$ | 544 |
| 33 | morpholino | $CH_2C_6H_5$ | 545 |
| 34 | morpholino | $C_2H_4C_6H_5$ | 542.5 |

We claim:
1. A compound of formula I:

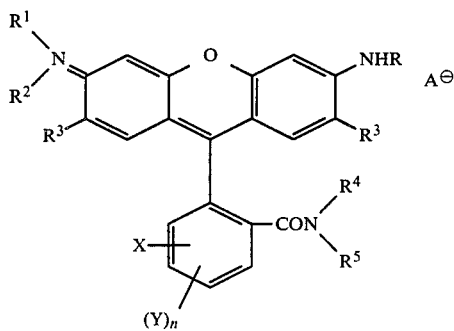

wherein $A^-$ is an anion, R, $R^1$ and $R^2$ are each independently hydrogen, alkyl, cycloalkyl, alkyl substituted by hydroxyl, $C_1-C_{13}$-alkoxy, chlorine, cyano, phenyl, tolyl, chlorophenyl or methoxyphenyl or $C_1-C_4$-alkyl substituted cycloalkyl, or one of said $R^1$ or $R^2$ radicals is phenyl, or $R^1$ and $R^2$, together with the nitrogen atoms, form a pyrrolidino, piperidino, morpholino, piperazino, N-methylpiperazino or N-β-hydroxyethylpiperazino ring, $R^3$ is hydrogen or $C_1-C_4$-alkyl, $R^4$ and $R^5$ independently of each other are alkyl, cycloalkyl, alkyl substituted by hydroxyl, $C_1-C_{13}$-alkoxy, chlorine, cyano, phenyl, tolyl, chlorophenyl or methoxyphenyl or $C_1-C_4$-alkyl substituted cycloalkyl, or aminoethyl, aminopropyl, amino(α-methyl)ethyl, methylaminopropyl, dimethylaminoethyl, diethylaminoethyl, dipropylaminoethyl, dibutylaminoethyl, diethylaminopropyl, aminopropoxypropyl, dimethylaminopropoxypropyl, aminoethylaminoethyl or aminopropylaminopropyl; or one of said $R^4$ or $R^5$ radicals is hydrogen, phenyl or naphthyl, or $R^4$ and $R^5$, together with the nitrogen atom, form a pyrrolidino, piperidino, morpholino, piperazino, N-methylpiperazino, or N-β-hydroxyethylpiperazino ring, n is 1, 2 or 3, X is hydrogen, chlorine, bromine, $C_1-C_4$-alkyl, $C_1-C_4$-alkoxy or nitro and Y is hydrogen or chlorine.

2. The compound of claim 1, which has the formula:

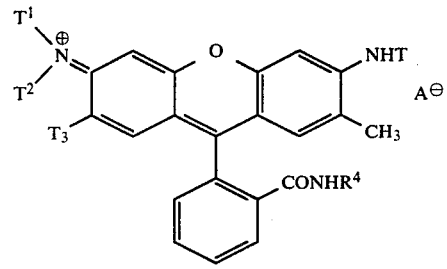

wherein T is $C_1-C_4$-alkyl, $T^1$ is hydrogen or $C_1-C_4$-alkyl, $T^2$ is $C_1-C_4$-alkyl or cyclohexyl, or $T^1$ and $T^2$, together with the nitrogen atom, form a pyrrolidino, piperidino, morpholino, piperazino, N-methylpiperazino, or N-β-hydroxyethylpiperazino ring, $T^3$ is hydrogen or methyl and $A^-$ and $R^4$ have the stated meanings.

3. The compound of claim 2, wherein T is $C_2H_5$, $T^1$ is H, $CH_3$ or $C_2H_5$, $T^2$ is $CH_3$, $C_2H_5$ or $C_6H_{11}$ and $R^4$ is branched alkyl of 3-13 carbon atoms or is $C_5-C_7$-cycloalkyl or $C_5-C_7$-cycloalkyl substituted by hydroxyl or $C_1-C_4$-alkyl.

4. The compound of claim 1, wherein said R, $R^1$ and $R^2$ groups are each selected from the group consisting of methyl, ethyl, propyl, butyl, pentyl, hexyl, octyl, decyl, dodecyl, tridecyl, 2-ethylhexyl, hydroxyethyl, hydroxypropyl, methoxyethyl, ethoxyethyl, propoxyethyl, butoxyethyl, methoxypropyl, butoxypropyl, methoxyethoxyethyl, ethoxyethoxyethyl, butoxyethoxyethyl, methoxyethoxy(α-methyl)ethyl, chloroethyl, cyanoethyl, benzyl, phenylethyl, methylbenzyl, chlorobenzyl, methoxybenzyl, dimethylbenzyl, cyclopentyl, cyclohexyl and methylcyclohexyl.

5. The compound of claim 1, wherein $R^4$ and $R^5$ are selected from the group consisting of aminoethyl, aminopropyl, amino(α-methyl)ethyl, methylaminopropyl, dimethylaminoethyl, diethylaminoethyl, dipropylaminoethyl, dibutylaminoethyl, diethylaminopropyl, aminopropoxypropyl, dimethylaminopropoxypropyl, aminoethylaminoethyl and aminopropylaminopropyl.

* * * * *